: # 3,582,503
POLYOLEFIN, WAX AND OIL BLENDS
Frederick H. Horne, Lake Bluff, Ill., assignor to
Mol-En Corp., Chicago, Ill.
No Drawing. Filed May 19, 1969, Ser. No. 826,000
Int. Cl. C08f 29/06
U.S. Cl. 260—2.5                                                5 Claims

ABSTRACT OF THE DISCLOSURE

A novel composition of matter consisting essentially of from about five percent to about forty-five percent of a polyolefin, particularly polyisobutylene, which has a molecular weight greater than 120,000, from about fifteen percent to about seventy percent of a microcrystalline wax having a drop point between 140° F. and 215° F. and from about five percent to about eighty percent oil with or without minor diluents, oxidizers, stabilizers, or other constituents. Composition is characterized by inertia to instantaneous pressure, conformance upon application of pressure and resistance to sag, as well as having cold flow characteristics to a resistance of gravity plus about 2 gms./in.$^2$ or above. Also is directed to the process of making such composition.

BACKGROUND OF THE INVENTION

This invention relates to a new composition of matter and more particularly is directed to a three or more component composition having very unique properties. More particularly this invention is directed to a mixture of polyisobutylene and/or other polyolefins, microcrystalline hydrocarbon based waxes and oil. The use of polyisobutylene is preferred.

Because of the unique combination of properties which I find in the present materials, they offer utility, among others, as shock resistant and body conforming structures, e.g., as for use in ski boots and other athletic equipment, footwear generally, as well as vibration dampering materials, etc. As noted in the abstract, such materials, when made of the compositions as hereinafter taught, are characterized by inertia to instantaneous pressure, conformance upon application of continuous pressure, resistance to sag and "memory"—i.e., the ability to return to its original state or close thereto after the pressure is relieved. Another aspect of this invention is directed to the use of such novel materials as for example in body conforming and moldable structures.

Accordingly, a principal object of my invention is to provide a novel composition of matter consisting essentially of polyolefin, particularly polyisobutylene, microcrystalline wax, oil and with or without various diluents, additives such as oxidizers and stabilizers and wherein the materials are in particular amounts and the microcrystalline wax and the polyisobutylene are of particular characteristics, which novel composition is characterized by inertia to instantaneous pressure, conformance upon application of continuous pressure, and resistance to sag.

Another object of my invention is to provide a novel composition wherein to the mixture aforesaid is added lightweight aggregate materials, for example polystyrene beads, or heavy aggregate such as $Fe_3O_4$.

Still another object of my invention is to provide a method of making the aforesaid compositions of matter.

These and other objects, features and advantages of my invention will become apparent to those skilled in this art of the following detailed disclosure thereof.

DESCRIPTION OF THE INVENTION AND THE PREFERRED EMBODIMENTS

I have invented a novel composition of matter which is characterized as aforesaid. In developing such materials, I have found that there are various ranges of constituents some of which are preferred and some of which are less desirable but still useful for the purposes of this invention.

From the broadest compositional standpoint the ranges of materials used herein are as follows:

| Constituent: | Weight percent |
|---|---|
| Polyisobutylene (M.W. greater than 120,000) | 5–45 |
| Microcrystalline wax, drop point 140° F. to 215° F. | 15–70 |
| Oil | 5–80 |

Within such broad range I have found somewhat better materials in the following range and such represents the preferred compositions hereof:

| Constituent: | Weight percent |
|---|---|
| Polyisobutylene (M.W. greater than 150,000) | 13–25 |
| Microcrystalline wax, drop point between 150–200° F. | 30–55 |
| Oil | Balance |

While other polyolefins such as polypropylene may be used herewith, the preferred material is polyisobutylene. Preferably such polyisobutylene has a molecular weight initially of around 200,000 and upon mixing with the other constituents hereof does not break down to less than 150,000 although it is still useful for present purposes, but somewhat less desirable, at molecular weights as low as 120,000. Such high molecular weight polyisobutylenes are commercially available.

Similarly, the microcrystalline waxes for use herewith are commercially available.

A broad range of oils, the third constituent hereof, may be used, including both the saturated and unsaturated varieties. Representative of such oils are peanut oil, tall oil, lubricating oils, neats foot oil, neutral blending stock and others. In some instances, as illustrated in the examples set forth below at least two different oils are used in the same composition.

In making the present compositions, the polyisobutylene is first worked. This is desirable, in fact highly preferred in order to make the polyisobutylene more receptive to and reactive with the other constituents of the finished composition. The high molecular weight polyisobutylene that is used in this invention normally comes in the form of relatively thick sheet stock that is relatively tough and somewhat difficult to mechanically work. I find however that it is readily formed into somewhat crumbled mesh-like sheets which adapt it to receive the microcrystalline wax.

The worked, high molecular weight polyisobutylene is then mixed with liquid microcrystalline wax and maintained in an oven for an adequate time and at a temperature of between 150° F., and 300° F., but below the volatilization point of the constituents, to permit the wax to enter and/or dissolve the structure of the polyisobutylene. I find that this is preferably done for around five days although longer times may be used. The two component mixture is then removed from the oven and while the wax is still in the molten state the oil and other constituents are blended into the finished mix and then well blended as by mixing or stirring or the like. Normally mixing occurs for about a half hour to yield the desired end products of this invention.

A few specific examples of compositions used herewith using worked polyisobutylene, 200,000 molecular weight, microcrystalline wax having a drop point between 150° and 200° F. and which were blended in with oil and other constituents, optionally, are as follows:

EXAMPLE 1

| Constituent | Grams | Percent by weight |
| --- | --- | --- |
| Polyisobutylene | 160 | 16 |
| Microcrystalline wax | 350 | 35 |
| Oil, bright stock | 230 | 23 |
| Tall oil | 260 | 26 |

EXAMPLE 2

| Constituent | Grams | Percent by weight |
| --- | --- | --- |
| Polyisobutylene | 236 | 19.7 |
| Microcrystalline wax | 525.6 | 43.8 |
| Neutral blending oil | 208.8 | 17.4 |
| Tall oil | 229.2 | 19.1 |

I also find that it is preferred to employ, within the ranges set out above, amounts of polyisobutylene and microcrystalline wax wherein the ratio of microcrystalline wax to polyisobutylene ranges between 1.5 and 2.5 to 1.

The three component composition, i.e., polyisobutylene, microcrystalline wax and oil has a density slightly less than 1. For many uses such a density is acceptable. However, for certain uses, as for example a body conforming pad in a ski boot where light weight is desired, I mix high bulk material with the basic composition aforesaid. One may readily blend for example a considerable volume of expanded polystyrene beads into the base material to provide a lightweight material yet not depart from its principal characteristics.

It will be understood that various modifications and variations may be affected without departing from the spirit or scope of the novel concepts of my invention.

I claim as my invention:

1. A novel composition of matter consisting essentially of:
   (a) from about 5% to 45%, by weight, polyisobutylene having a molecular weight greater than 120,000;
   (b) from 15% to 70%, by weight, microcrystalline wax having a drop point between 140° F. and 215° F., and wherein there is more microcrystalline wax than polyisobutylene; and
   (c) from about 5% to 80%, by weight, of at least one oil selected from the group consisting of peanut oil, tall oil, lubricating oil, netural blending stock, safflower oil and neats foot oil;

which composition is characterized by resistance to instantaneous pressures, conformance upon application of continuous pressure and resistance to sag.

2. The composition as defined in claim 1 wherein lightweight aggregate is added thereto.

3. The composition as defined in claim 2 wherein said lightweight aggregate consists of expanded polystyrene.

4. The composition as defined in claim 1 wherein:
   (a) The polyisobutylene has a molecular weight greater than 150,000 and is present in amounts ranging from 13% to 25%;
   (b) the microcrystalline wax has a drop point ranging from between 150° F. and 200° F., and is present in amounts ranging from 30% to 55%; and
   (c) the ratio of microcrystalline wax content to polyisobutylene content ranges between 1.5 and 2.5 to 1.

5. The process of making a material as defined in claim 1 which comprises the steps of:
   (a) working the polyisobutylene;
   (b) combining the polyisobutylene with molten microcrystalline wax and holding the two component mix at a temperature of around 190° F. to 225° F. for around at least 120 hours;
   (c) adding oil to the aforesaid mix and blending the constituents.

References Cited

UNITED STATES PATENTS 3,326,835  6/1967  Signorelli et al. _____ 260—28.5

DONALD E. CZAJA, Primary Examiner

D. J. BARRACK, Assistant Examiner

U.S. Cl. X.R.

36—2.5; 128—595; 260—23, 27, 28.5